(12) United States Patent
Finkelstein et al.

(10) Patent No.: US 6,343,139 B1
(45) Date of Patent: Jan. 29, 2002

(54) FAST LOCATION OF ADDRESS BLOCKS ON GRAY-SCALE IMAGES

(75) Inventors: Lev Finkelstein, Netanya; Andrei Heilper; Eugene Wallach, both of Haifa, all of (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/268,137

(22) Filed: Mar. 12, 1999

(51) Int. Cl.[7] .................................................. G06K 9/00
(52) U.S. Cl. ............................ 382/101; 707/3; 707/516
(58) Field of Search ................................ 382/100, 101, 382/135, 112–114, 169, 176, 181, 190, 218–219, 237, 201, 292, 365; 345/762, 776; 705/77, 76; 707/3, 516

(56) References Cited

U.S. PATENT DOCUMENTS 5,481,712 A * 1/1996 Silver et al. .................... 717/1
6,002,401 A * 12/1999 Baker ........................... 345/349
6,092,065 A * 7/2000 Floratos et al. ................ 707/6
6,154,746 A * 11/2000 Berchtold et al. .......... 707/400

OTHER PUBLICATIONS

Kunddu, A. et al., "Machine Reading of Handwritten Text Information in Field Technician's Maps", IEEE, 1998, pp. 943–947.*

Schreiber I. et al., "Polygonal Object Recognition", IEEE 1990, pp. 852–859.*

* cited by examiner

*Primary Examiner*—Jayanti K. Patel
(74) *Attorney, Agent, or Firm*—Darby & Darby

(57) ABSTRACT

A method for locating a structured field in a gray-scale image of an object, including choosing a plurality of anchor points in the image, each anchor point having a gray-scale value associated therewith. For each anchor point there is determined a horizontal variation dependent on a difference between the gray-scale value of the anchor point and the gray-scale value of a horizontally neighboring anchor point, and there is also determined a vertical variation dependent on a difference between the gray-scale value of the anchor point and the gray-scale value of a vertically neighboring anchor point. Those anchor points whose vertical and horizontal variations obey a first or a second predefined condition are defined as vertically or horizontally dominant respectively. One or more kernels are defined in the image, each such kernel comprising a group of anchor points n predetermined mutual proximity and satisfying a third predefined condition relating the number of vertically-dominant and horizontally-dominant anchor points in the group. The structured field in the image is located using one or more kernels.

24 Claims, 14 Drawing Sheets

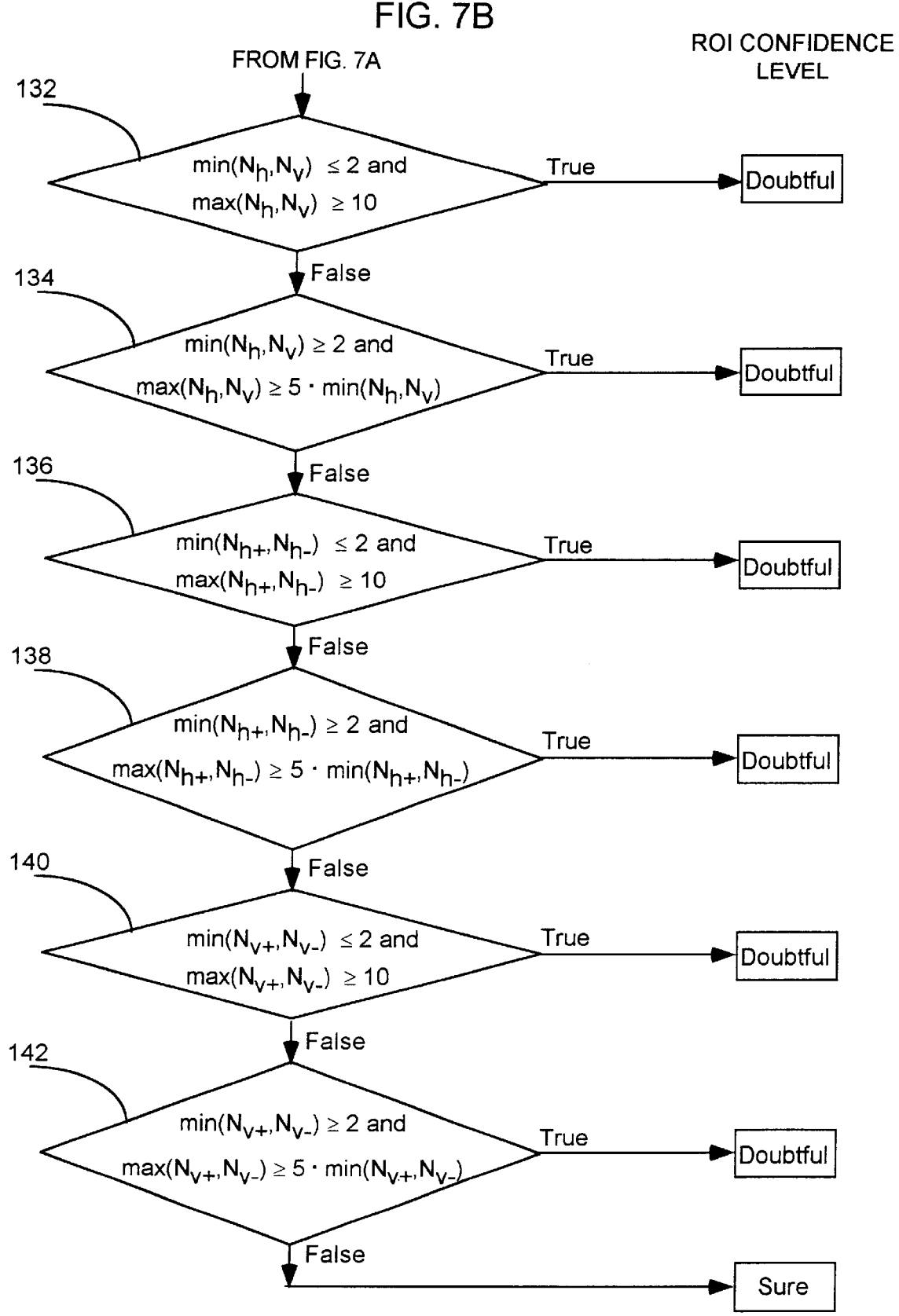

FAST LOCATION OF ADDRESS BLOCKS ON GRAY-SCALE IMAGES

FIELD OF THE INVENTION

The present invention relates generally to automatic sorting, and specifically to automatic location of text or other well-defined features on material being sorted.

BACKGROUND OF THE INVENTION

A crucial problem in automatic sorting systems, well known in the art, is the location of desired fields on the surface of an object whose image is captured and analyzed. Typically the fields have some predefined visual structure having a geometric component, for example, a text field comprising sets of alphanumeric characters in a substantially linear layout. In the context of the present patent application and in the claims, such a field is referred to as a structured field. Existing approaches to this problem comprise binarization of an image as a first step, wherein a gray-scale image is first converted to binary form, and wherein, for the case of text location, domain-oriented heuristics are used as a second step. An example of this approach is described in an article titled "Postal Address Block Location in Real Time," by Palumbo et al., in the July, 1992, issue of Computer, which is incorporated herein by reference.

Although binarization of images allows large volumes of image data to be processed quickly, methods involving binarization have several drawbacks, since no perfect binarization is known. As a result some image fields that are being searched for will be consistently discarded, since binarization reduces the available information about the image. Furthermore, for large images, such as images of postal packets, the time required for binarization is substantial.

In searching for a text field such as an address block in an automatic parcel sorting system, the text field must always be found, or else the entire sorting process fails. Also, the number of falsely identified blocks must be minimal, in order not to generate too much work for the rest of the modules of the sorting system.

SUMMARY OF THE INVENTION

It is an object of some aspects of the present invention to provide an improved method and apparatus for location of structured fields in an image.

It is a further object of some aspects of the present invention to provide an improved method and apparatus for location of text fields in an image.

It is an object of some aspects of the present invention to provide an improved method and apparatus for automatic sorting of mail.

In preferred embodiments of the present invention, a gray-scale image of an object having one or more structured fields, most preferably text fields, is generated. Preferably, the image is generated by a line imaging system, and the generated image is digitized and transferred in digital form to a central processing unit. Most preferably, the processing unit comprises dedicated hardware including a first and a second processing stage, described in more detail below, which operate on the digitized image sequentially in real time. Alternatively, the processing unit comprises a mixture of dedicated hardware and general-purpose, software-driven computing elements. After the stages have operated on the digitized image, the processing unit determines areas in the image where the results indicate there are text fields, according to predetermined conditions incorporated into the processing stages.

In some preferred embodiments of the present invention, the digitized image data of the object is processed by the first processing stage, which detects areas of the image having a high probability of containing text, herein termed "text kernels." Most preferably, the algorithm operates on an array of image pixels, herein termed "anchor points," which are separated by predetermined distances. Positions of text kernels are determined by locating points, herein termed "dominant points," around the anchor points which have substantial gray-scale differences compared to horizontally or vertically adjacent points. Areas around the text kernels are analyzed, and those considered by the processing stage to have a high probability of containing text are grouped together. The first stage concludes by building a first map of text regions based around the text kernels.

The output of the first processing stage is processed by the second processing stage, wherein the text regions found in the first stage are analyzed and refined further. Preferably, each of the text regions has its anchor points reallocated, so that the anchor points are separated by distances substantially smaller than in the first stage. Preferably the anchor points separation for the second stage is half the separation of the first stage. As described for the first stage, regions having a high probability of containing text are identified. The second stage concludes by outputting positions of regions of interest (ROIs) likely to contain text, together with an associated ranking for each ROI, made in accordance with geometrical characteristics of the ROI.

In some preferred embodiments of the present invention, the gray-scale image comprises an image of an object, such as a parcel, to be sorted for mail delivery. Preferably, the parcel travels on a conveyor belt system comprising means for sorting parcels into appropriate groups. For example, the conveyer belt system is able to sort parcels into those with no identified text fields, those with one text field, and those with a plurality of possible text fields. Alternatively, other methods of sorting, as are known in the art, are used. After determination of regions on the parcel which include text fields, as described above, the parcel is sorted into the appropriate group by the processing unit operating on the sorting system. The text field is then read and interpreted, preferably using an optical character recognition algorithm, as is known in the art, and the parcel is routed for delivery accordingly.

The present invention enables very fast detection of fields within an image which have well-defined directional properties, with substantially greater accuracy, and with substantially fewer falsely identified blocks, compared to methods at present known in the art.

There is therefore provided, in accordance with a preferred embodiment of the present invention, a method for locating a structured field in a gray-scale image of an object, including:

choosing a plurality of anchor points in the image, each anchor point having a gray-scale value associated therewith;

determining for each anchor point a horizontal variation dependent on a difference between the gray-scale value of the anchor point and the gray-scale value of a horizontally neighboring anchor point and a vertical variation dependent on a difference between the gray-scale value of the anchor point and the gray-scale value of a vertically neighboring anchor point;

defining as vertically or horizontally dominant respectively those anchor points whose vertical and horizontal variations obey a first or a second predefined condition;

identifying one or more kernels in the image, each such kernel comprising a group of anchor points in predetermined mutual proximity and satisfying a third predefined condition relating the number of vertically-dominant and horizontally-dominant anchor points in the group; and locating the structured field in the image using the one or more kernels.

Preferably, the structured field includes an alphanumeric text field.

Alternatively, the text field includes an address field in a mailed object.

Preferably, the method includes sorting the object responsive to the structured field that is located.

Preferably, choosing the plurality of anchor points includes choosing the anchor points to be at the vertices of congruent contiguous rectangles.

Preferably, locating the structured field includes dividing the image into a plurality of regions and finding one or more of the regions which have large numbers of kernels therein relative to others of the regions.

Alternatively, finding the one or more of the regions includes assigning a ranking level to each of the regions indicative of a likelihood that the region has a desired characteristic.

Further alternatively, assigning the ranking level includes evaluating kernels in peripheral regions adjacent to the one or more regions.

Alternatively, assigning the ranking level includes assigning a ranking responsive to respective numbers of vertically dominant points and horizontally dominant points in the one or more regions.

Further alternatively, locating the structured field includes using an iterative location method, including choosing additional anchor points in the one or more regions and repeating with respect to the additional anchor points the steps of determining the horizontal and vertical variations, defining the vertically- and horizontally-dominant points and identifying the one or more kernels.

Alternatively, choosing the additional anchor points includes choosing anchor points mutually more closely spaced than the anchor points outside the one or more regions.

Preferably, the first predefined condition includes that the vertical variation be above a predetermined threshold and exceed the horizontal variation by a predetermined factor.

Preferably, the second predefined condition includes that the horizontal variation be above a predetermined threshold and exceed the vertical variation by a predetermined factor.

Preferably, the third predefined condition includes that there be at least one vertically dominant point and at least one horizontally dominant point within the group.

There is further provided, in accordance with a preferred embodiment of the present invention, a method for locating a structured field in a gray-scale image of an object, including:

choosing a plurality of anchor points in the image, each anchor point having a gray-scale value associated therewith;

determining for each anchor point, a horizontal variation dependent on a difference between the gray-scale value of the anchor point and the gray-scale value of a horizontally neighboring anchor point and a vertical variation dependent on a difference between the gray-scale value of the anchor point and the gray-scale value of a vertically neighboring anchor point;

defining as vertically-dominant those anchor points whose vertical variations exceed their horizontal variations by a predefined factor, and as horizontally-dominant those anchor points whose horizontal variations exceed their vertical variations by a predefined factor; and locating the structured field in the image responsive to the locations of at least some of the vertically-dominant and horizontally-dominant anchor points.

Preferably, locating the structured field includes locating a text field.

Alternatively, locating the structured field includes finding a region of the image including a mixture of horizontally- and vertically-dominant anchor points.

There is further provided, in accordance with a preferred embodiment of the present invention, a method for sorting an object marked with information in a structured field thereon, including:

capturing a gray-scale image of the object;

choosing a plurality of anchor points in the image, each anchor point having a gray-scale value associated therewith;

determining for each anchor point, a horizontal variation dependent on a difference between the gray-scale value of the anchor point and the gray-scale value of a horizontally neighboring anchor point and a vertical variation dependent on a difference between the gray-scale value of the anchor point and the gray-scale value of a vertically neighboring anchor point;

defining as vertically or horizontally dominant those anchor points whose vertical and horizontal variations respectively obey a first or a second predefined condition;

identifying one or more kernels in the image, each such kernel comprising a group of anchor points in predetermined mutual proximity and satisfying a third predefined condition relating the number of vertically-dominant and horizontally-dominant anchor points in the group;

locating the structured field using the one or more kernels;

deciphering information contained in the structured field; and routing the object responsive to the deciphered information.

There is further provided, in accordance with a preferred embodiment of the present invention, apparatus for locating a structured field in a gray-scale image of an object, including:

an image capture device which forms the gray-scale image of the object; and an image processing unit which:

chooses a plurality of anchor points in the image;

associates with each anchor point a gray-scale value;

determines for each anchor point a horizontal variation dependent on a difference between the gray-scale value of the anchor point and the gray-scale value of a horizontally neighboring anchor point and a vertical variation dependent on a difference between the gray-scale value of the anchor point and the gray-scale value of a vertically neighboring anchor point;

defines as vertically or horizontally dominant respectively those anchor points whose vertical and horizontal variations obey a first or a second predefined condition;

identifies one or more kernels in the image, each such kernel including a group of anchor points in predetermined mutual proximity and satisfying a third predefined condition relating the number of vertically-dominant and horizontally-dominant anchor points in the group; and locates the structured field in the image using the one or more kernels.

Preferably, the structured field includes an alphanumeric text field.

Alternatively, the text field includes an address field in a mailed object.

Further alternatively, the apparatus includes an object sorter which sorts the object responsive to the structured field that is located.

There is further provided, in accordance with a preferred embodiment of the present invention, apparatus for locating a structured field in a gray-scale image of an object, including:

an image capture device which forms the gray-scale image of the object; and an image processing unit which:

chooses a plurality of anchor points in the image;

associates with each anchor point a gray-scale value;

determines for each anchor point, a horizontal variation dependent on a difference between the gray-scale value of the anchor point and the gray-scale value of a horizontally neighboring anchor point and a vertical variation dependent on a difference between the gray-scale value of the anchor point and the gray-scale value of a vertically neighboring anchor point;

defines as vertically-dominant those anchor points whose vertical variations exceed their horizontal variations by a predefined factor, and as horizontally-dominant those anchor points whose horizontal variations exceed their vertical variations by a predefined factor; and locates the structured field in the image responsive to the locations of at least some of the vertically-dominant and horizontally-dominant anchor points.

There is further provided, in accordance with a preferred embodiment of the present invention, apparatus for sorting an object marked with information in a structured field thereon, including:

an image capture device which forms the gray-scale image of the object;

an image processing unit which:

chooses a plurality of anchor points in the image;

associates with each anchor point a gray-scale value;

determines for each anchor point, a horizontal variation dependent on a difference between the gray-scale value of the anchor point and the gray-scale value of a horizontally neighboring anchor point and a vertical variation dependent on a difference between the gray-scale value of the anchor point and the gray-scale value of a vertically neighboring anchor point;

defines as vertically or horizontally dominant those anchor points whose vertical and horizontal variations respectively obey a first or a second predefined condition;

identifies one or more kernels in the image, each such kernel including a group of anchor points in predetermined mutual proximity and satisfying a third predefined condition relating the number of vertically-dominant and horizontally-dominant anchor points in the group;

locates the structured field using the one or more kernels;

deciphers information contained in the structured field; and an object router which routs the object responsive to the deciphered information.

The present invention will be more fully understood from the following detailed description of the preferred embodiments thereof, taken together with the drawings in which:

BRIEF DESCRIPTION OF THE DRAWINGS

FIGS. 7A and 7B are flowcharts that schematically illustrate a process involved in determining a confidence level of a text field found in one of the steps of FIG. 6, in accordance with a preferred embodiment of the present invention.

DETAILED DESCRIPTION OF A PREFERRED EMBODIMENT

Figure 1:
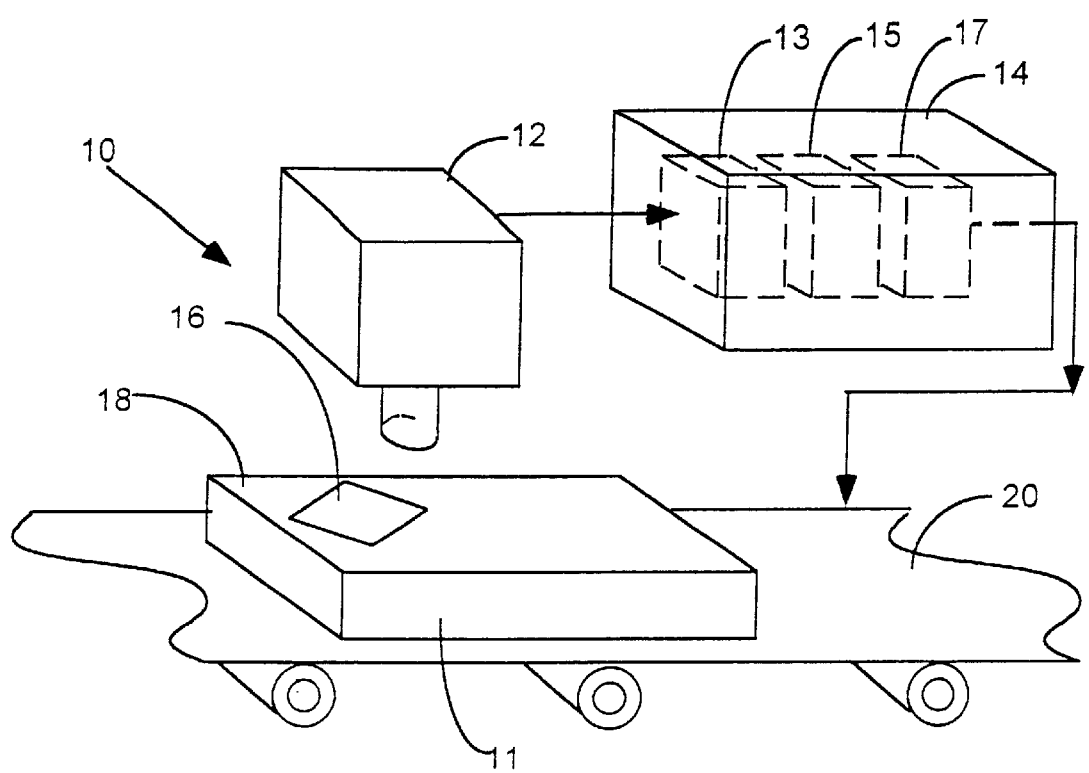
FIG. 1 is schematic perspective drawing showing a parcel sorting system, in accordance with a preferred embodiment of the present invention.

Reference is now made to FIG. 1, which is a schematic perspective view of a conveyer-operated sorting system 10, which operates by finding and analyzing text blocks on a parcel 11, in accordance with a preferred embodiment of the present invention. Most preferably, system 10 comprises a line imaging camera 12, for example, a CL-C8-6000A produced by Dalsa Inc., of Waterloo, Ontario, Canada, or an AV3656 produced by Accusort Systems Inc., of Telford, Pa., and a processing unit 14. Camera 12 generates a gray-scale image of a side 18 of parcel 11, preferably by a push-broom technique, as is known in the art. Side 18 comprises at least one field 16 having text therein. Preferably parcel 11 is on a conveyer belt 20, for the purposes of being sorted, within a mail facility.

The image generated by camera 12 is transferred to processing unit 14 wherein the image is analyzed in order to determine regions of interest (ROIs) of side 18 having text present. Most preferably, the determination of ROIs of text is performed in a first, general search, stage processor 13, followed by a second, specific locator, stage processor 15, operating on the image. Preferably, processor 13 and processor 15 are embodied in software modules comprised in software preloaded into unit 14. Alternatively, processor 13 and processor 15 are dedicated processing units. It will be understood, however, that the method for identifying the text blocks described hereinbelow may be applied as well to images acquired by any other suitable means and using other processing architectures, including general-purpose, programmable components and/or dedicated hardware components, as are known in the art. The operation of the first stage processor and of the second stage processor is described in detail hereinbelow.

FIGS. 2A–2F are images schematically illustrating progressive stages of analysis of an image of parcel 11 in system 10, in accordance with a preferred embodiment of the present invention. The images of FIGS. 2A–2F will be referred to in the description of the operation of the system that follows. An example of a typical gray-scale image generated by camera 12 is shown as a black and white drawing in FIG. 2A. A rectangle 30 shows the limits of the gray-scale image. For clarity, the position of an address label 32 on parcel 11 is indicated by a heavy black rectangle in FIG. 2A.

In the following description of the operation of the system, numerical values are given for parameters used by processing unit 14 when camera 12 is a CL-C8-6000A or an AV3656, which have different optical characteristics. Preferably, camera 12 is configured to produce images comprising rectangular arrays of pixels at resolutions of the order of 200 pixels per inch on the package surface.

Figure 3:
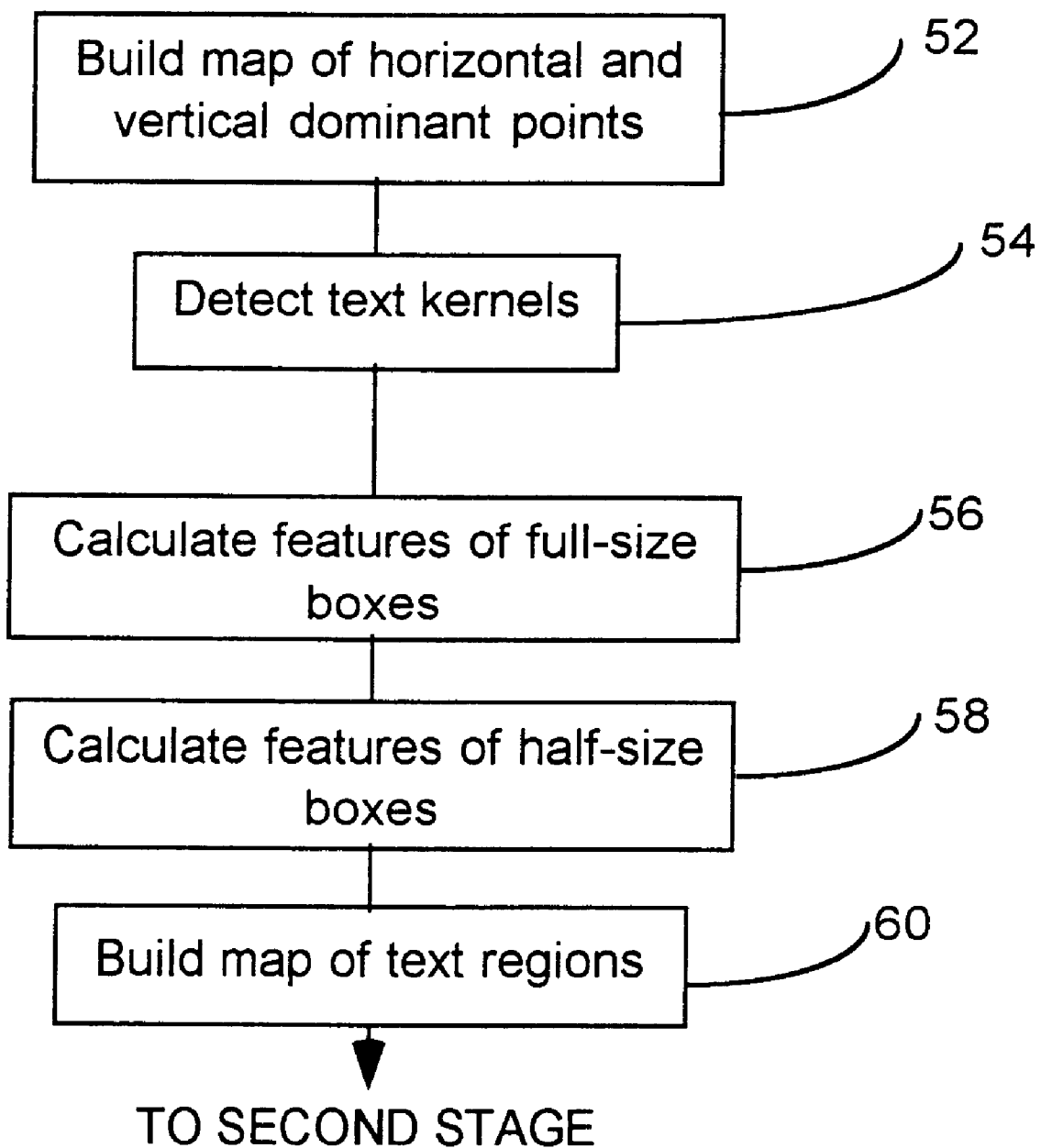
FIG. 3 is a flowchart that schematically illustrates a first processing stage used in locating text fields in an image, in accordance with a preferred embodiment of the present invention.

FIG. 3 is a flow chart illustrating a first processing stage carried out by first stage processor 13, wherein a general search for text ROIs is performed, in accordance with a preferred embodiment of the present invention. Step 52 is a dominance determining step wherein a first plurality of image pixels {(i,j)}, herein termed anchor points, each having a corresponding intensity $I_{ij}$, are chosen from the image. Most preferably, the plurality of anchor points are at the vertices of congruent contiguous rectangles defined by a predetermined vector ($s_x$, $s_y$). For example, we have found that ($s_x$, $s_y$)=(6, 6) gives very good results for sorting mail packages in the imaging configuration described hereinabove.

For each anchor point the following calculations are performed:

$$\Delta^{hor}_{ij} = I_{i+\Delta x, j} - I_{i,j} \quad (1)$$

wherein $\Delta^{hor}_{ij}$ is termed the horizontal variation, and $$\Delta^{ver}_{ij} = I_{i, j+\Delta y} - I_{i,j} \quad (2)$$

wherein $\Delta^{ver}_{ij}$ is termed the vertical variation, and wherein $\Delta x$ and $\Delta y$ are predetermined x and y displacements respectively.

A point (i,j) is herein considered to be horizontally dominant if:
Either $$|\Delta^{hor}_{ij}| \geq N \text{ and } |\Delta^{hor}_{ij}| > \tau |\Delta^{ver}_{ij}| \quad (3)$$

or $$|\Delta^{hor}_{ij}| \geq N \text{ and } |\Delta^{hor}_{ij}| \geq T_1 \text{ and } |\Delta^{ver}_{ij}| \leq T_2 \quad (4)$$

or both condition (3) and condition (4) are true, wherein N is a predetermined value which is set dependent on the noise created by image quantization, and $\tau$ is a predetermined value which is set dependent upon the image contrast. $T_1$ and $T_2$ correspond to a first and a second predetermined amplification limit value respectively, and are used to compensate for low contrast images. For example, for system 10 of FIG. 1, the values of ($\tau$, N, $T_1$, $T_2$) are preferably (4, 20, 3, 15) for camera CL-C8-6000A and (3, 16, 3, 15) for camera AV3656. Thus, for example, a point will be horizontally dominant if it lies on a vertical line, since such lines have large values of horizontal variation, $\Delta^{hor}_{ij}$, and small values of vertical variation, $\Delta^{ver}_{ij}$.

A point (i,j) is herein considered to be vertically dominant if:
Either $$|\Delta^{ver}_{ij}| \geq N \text{ and } |\Delta^{ver}_{ij}| > \tau |\Delta^{hor}_{ij}| \quad (5)$$

or $$|\Delta^{ver}_{ij}| \geq N \text{ and } |\Delta^{ver}_{ij}| \geq T_1 \text{ and } |\Delta^{hor}_{ij}| \leq T_2 \quad (6)$$

or both condition (5) and condition (6) are true. It will be appreciated that a point will be vertically dominant if it lies on a horizontal line, since such lines have large values of vertical variation, $\Delta^{ver}_{ij}$, and small values of horizontal variation, $\Delta^{hor}_{ij}$. If a point is neither vertically dominant nor horizontally dominant as defined hereinabove, it is assumed to be a background point.

Figure 2A:
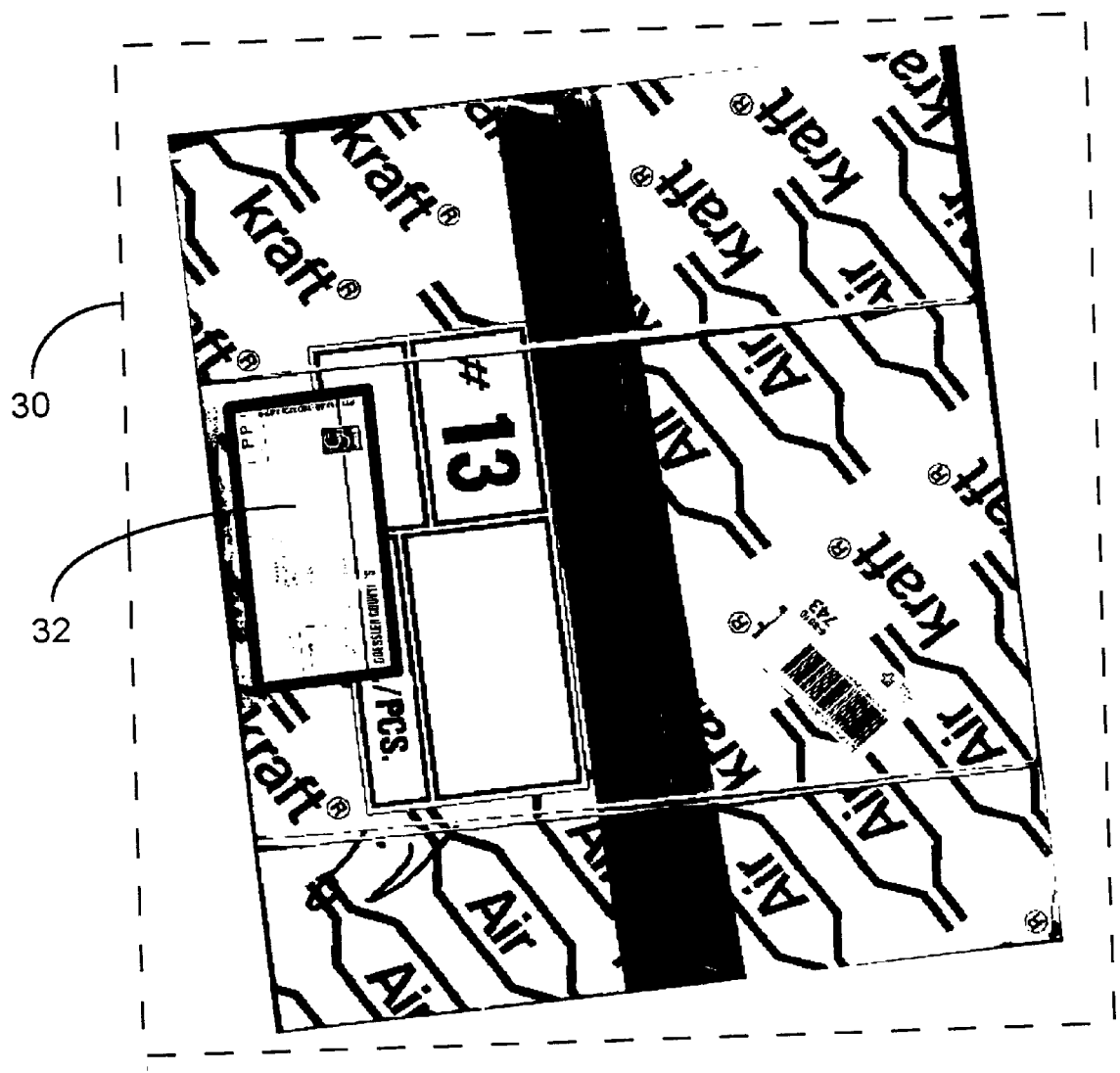
FIGS. 2A–2F are images schematically illustrating progressive stages of analysis of an image in the system of FIG. 1, in accordance with a preferred embodiment of the present invention.
Figure 2B:
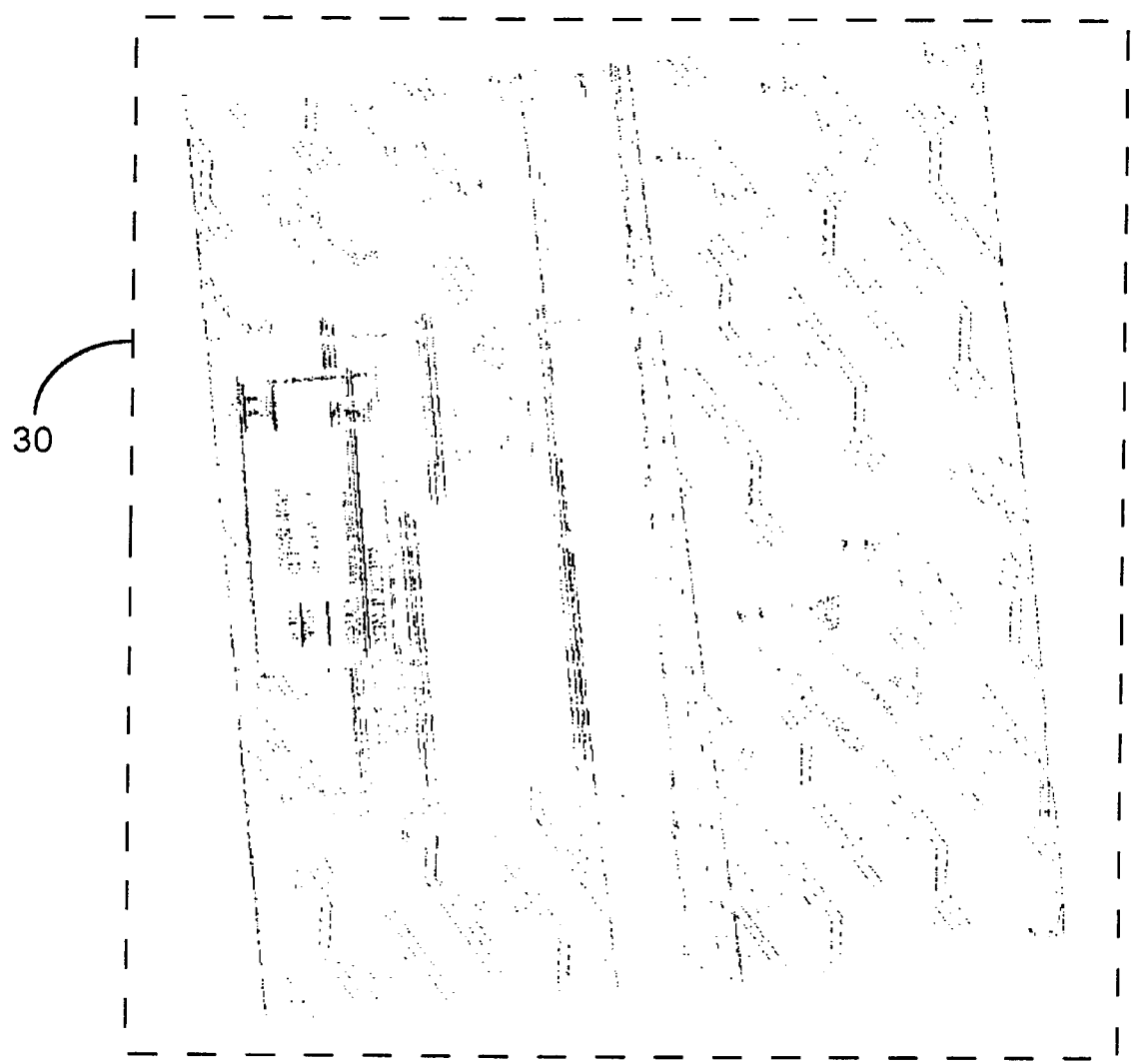
Figure 2C:
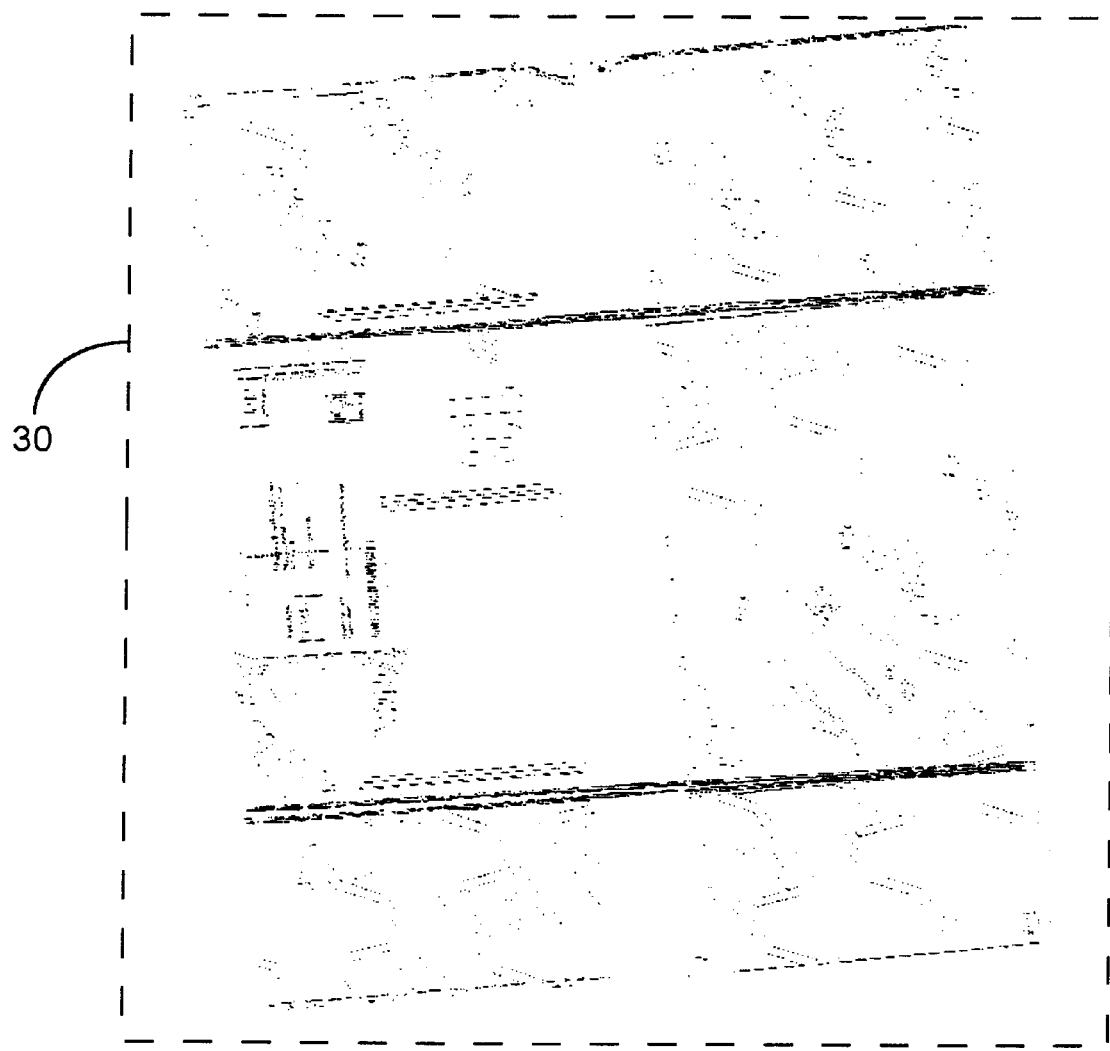

After determination of vertical and horizontal dominant points as described above, the values of these points are transferred onward to step 54 for an initial determination of text ROIs. For example, FIG. 2B is an illustration of horizontally dominant points, and FIG. 2C is an illustration of vertically dominant points, corresponding to the image of FIG. 2A, after passage through step 52.

At step 54, an initial assessment is made of positions in the image likely to contain text, herein referred to as text kernels. Generally, text contains both horizontally dominant and vertically dominant points in approximately equal values, so that:

A text kernel is herein defined as a set of anchor points such that for each point there exists at least one horizontally dominant point (i',j') and at least one vertically dominant point (i", j"), such that:

$$|i-i'| + |j-j'| \leq k \text{ and } |i+i''| + |j-j''| \leq k' \quad (7)$$

wherein k and k' are predetermined whole numbers defining a size of a neighborhood of a text kernel.

A text kernel according to the definition hereinabove will thus include at least one horizontally dominant point and at least one vertically dominant point.

Figure 2D:
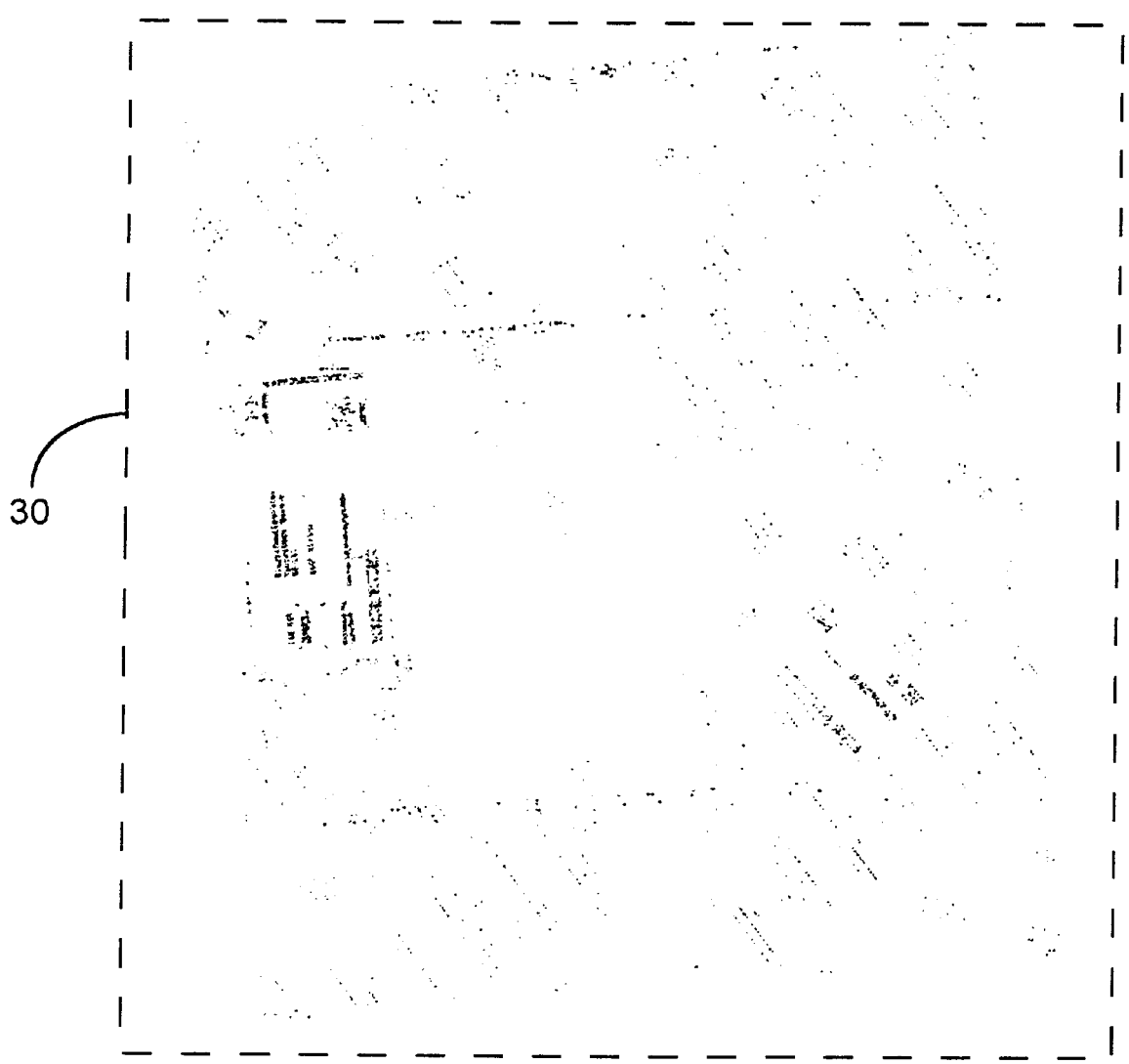
Figure 4:
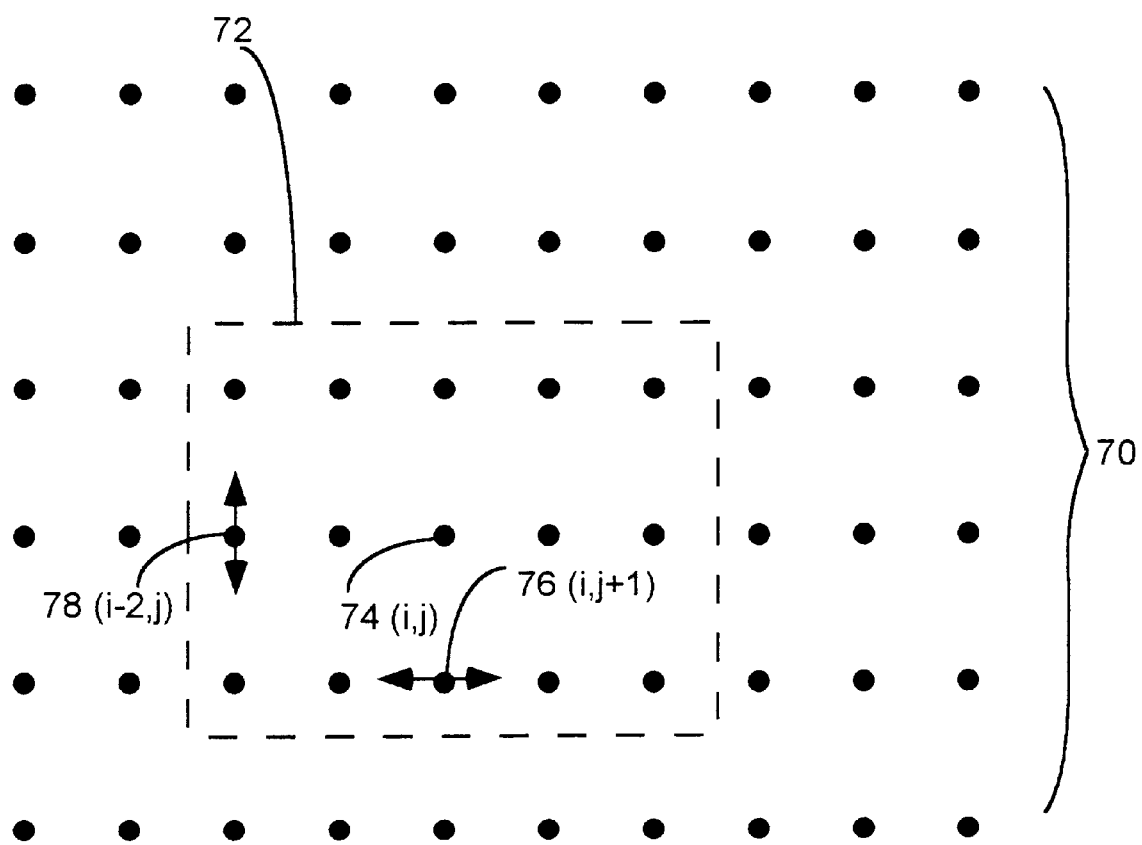
FIG. 4 is a schematic diagram showing points in an image used in determination of a text kernel, in accordance with preferred embodiment of the present invention.

FIG. 4 illustrates an array 70 of anchor points in an image in which a typical text kernel 72 is detected, according to a preferred embodiment of the present invention, wherein k=1 and k'=2. An array of anchor points 70 comprises an anchor point 74 having coordinates (i,j). A point 76, having coordinates (i,j+1), is horizontally dominant, and a point 78, having coordinates (i−2,j), is vertically dominant. Since a region 72 around point 74 comprises a vertically dominant and a horizontally point, region 72 is a text kernel. As an example, FIG. 2D illustrates text kernel positions found after passage of the image of FIG. 2A through step 54.

After determination of text kernels as described hereinabove, values of positions of text kernels and of horizontally and vertically dominant points are transferred to step 56 (FIG. 3), wherein is made a first evaluation whether a rectangular region of the image comprises text. Most preferably, the image is divided into a plurality of rectangular boxes sized m×n pixels, wherein m and n are predetermined whole numbers. We have found that m=n=16 gives good results. Each box is classified as containing or not containing text, according to the number of horizontally dominant points ($N_{h1}$), vertically dominant points ($N_{v1}$), and text kernel points ($N_{k1}$) present in the box. A box is assumed to contain text if $$N_{h1} > 0 \text{ and } N_{v1} > 0 \text{ and } N_{k1} > 0 \quad (8)$$

is true. If equation (8) is not satisfied, the box is assumed not to contain text. All the text boxes are grouped in ROIs according to a "grouping" criterion defined as follows:

If any two text boxes have a common horizontal border or a common vertical border, the two text boxes are assumed to be included in the same ROI.

Positions of boxes containing text, as determined in step 56, are transferred to step 58, wherein is made a second evaluation whether regions including and surrounding the respective boxes comprise text, as described hereinbelow.

Figure 5:
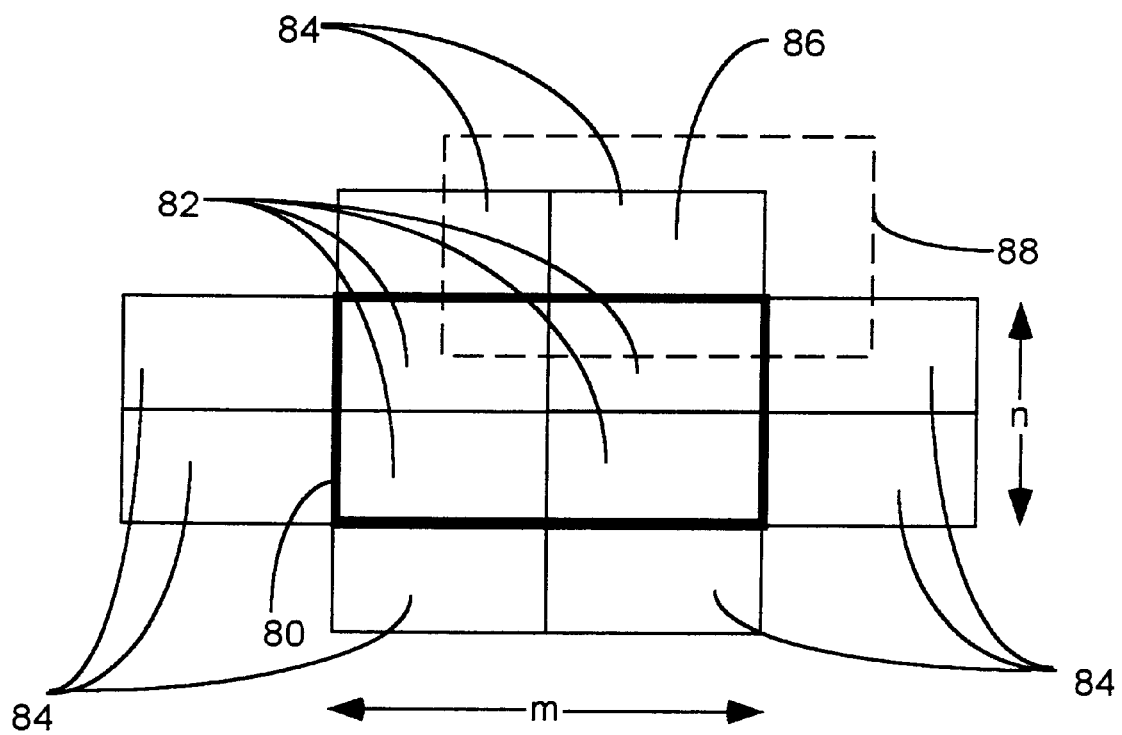
FIG. 5 is a schematic diagram showing regions analyzed within a text kernel in an image, in accordance with preferred embodiment of the present invention.

FIG. 5 illustrates the regions checked in step 58, according to a preferred embodiment of the present invention. In the following description an expression of the form min(a, b, c, . . . ) is equivalent to the minimum of the set of values a, b, c, . . . , and an expression of the form max(a, b, c, . . . ) is equivalent to the maximum of the set of values a, b, C, . . . A rectangular region 80 in the image (outlined for clarity with a thick edge), which has been selected as containing text in step 56, is subdivided internally into a plurality of congruent rectangles 82. Preferably, the subdivision is of a form so that there are four rectangles 82. External to box 80, and contiguous to the sides thereof, are formed a further plurality of rectangles 84 substantially similar in dimensions to rectangles 82. Around each rectangle 82 and 84, a region of size m×n pixels is checked in order to classify the respective rectangle as containing or not containing text. For example, a region 88 is checked around a rectangle 86.

Each rectangle 82 and 84 is classified as containing or not containing text according to the following parameters:

1. Number of horizontally dominant points ($N_{h2}$) and vertically dominant points ($N_{v2}$) in the m×n region centered on the rectangle; and
2. Number of text kernel points ($N_{k2}$) in the m×n region centered on the rectangle.

Based on these parameters, the criteria used to decide if rectangle 82 or 84 contains text are:

If $N_{h2}=N_{v2}=0$, the rectangle is assumed not to contain text;

If $min(N_{h2}, N_{v2})=0$, and $N_{k2}=0$, the rectangle is assumed not to contain text;

Otherwise the rectangle is assumed to contain text.

All the text boxes are then grouped in ROIs according to the grouping criterion defined with reference to equation (8) hereinabove.

The positions of the text boxes are transferred to step 60 (FIG. 3), wherein a first, preliminary, map of text ROIs of the image is constructed based on the results of the preceding steps. The map of text ROIs is then transferred to a second stage, described in detail hereinbelow, wherein fine features and false alarms are detected, and a final position and a final rank of each ROI of text is made.

Figure 6:
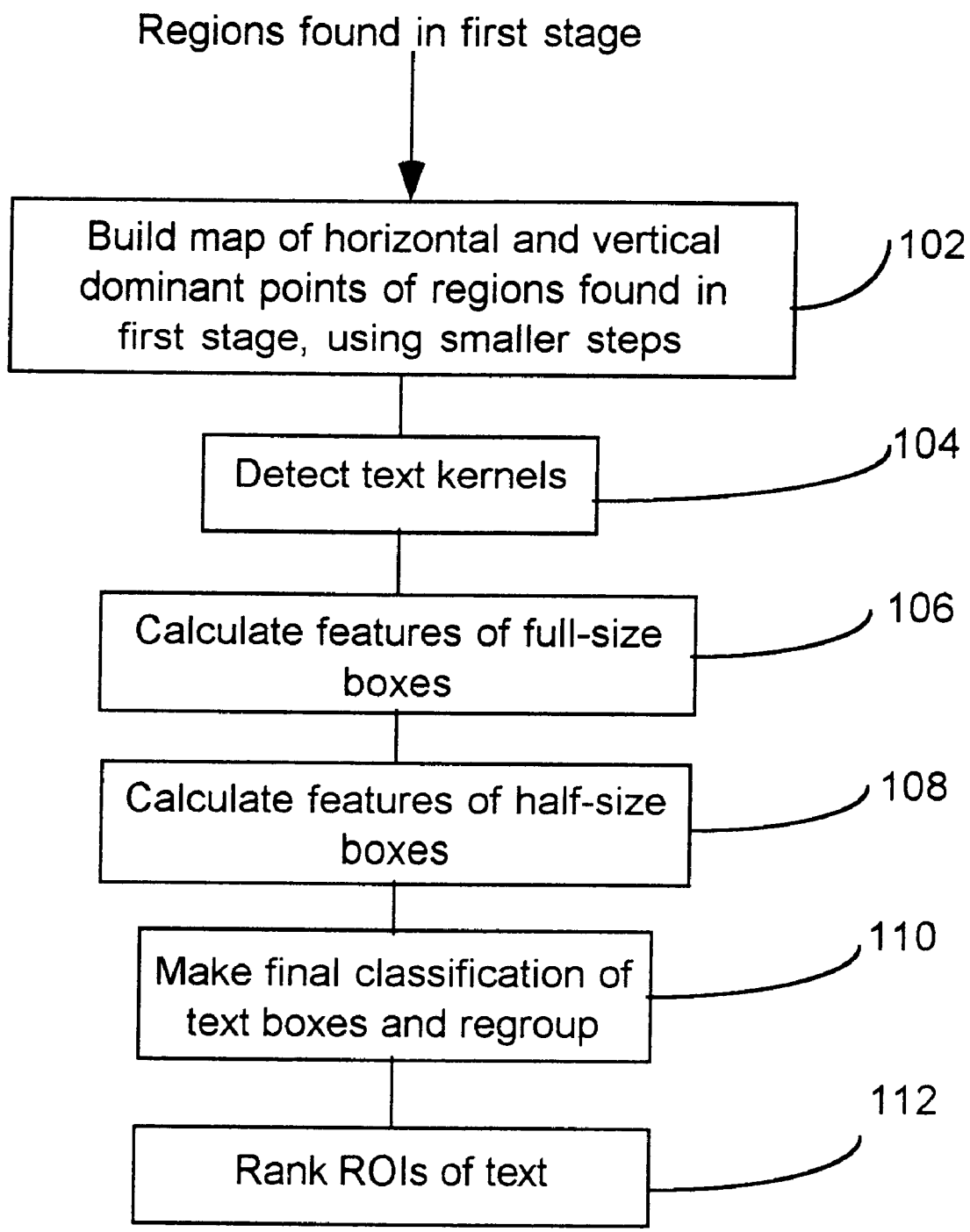
FIG. 6 is a flowchart that schematically illustrates a second processing stage used in locating text fields in an image, in accordance with a preferred embodiment of the present invention.

FIG. 6 is a flow chart illustrating the second processing stage, performed in second stage processor 15 (FIG. 1), in accordance with a preferred embodiment of the present invention. The actions performed in steps 102, 104, 106, 108, and 110, of the second stage correspond substantially with the actions described in steps 52, 54, 56, 58, and 60, respectively, apart from certain differences described hereinbelow. The second processing stage performs a second iteration on the text ROIs found by the first stage, in order to improve the detection of the text ROIs, to delete ROIs that have been incorrectly identified, and to assign a rank to the ROIs identified on completion of the second stage as text ROIs.

In step 102, a second plurality of anchor points are chosen within the text ROIs identified in the first stage (FIG. 3), whereby the anchor points are a rectangular array of points defined by a sub-vector of vector ($s_x, s_y$) Most preferably, the sub-vector corresponds to ($s_x/2, s_y/2$). As described hereinabove for step 52, calculations given by equations (1) and (2), and conditions given by equations (3) and (4) and equations (5) and (6) are applied to find horizontally and vertically dominant points.

In addition, the following conditions are imposed in step 102:

if a point (i, j) is horizontally dominant, it is herein considered positively dominant if $\Delta^{hor}_{ij} \geq 0$, and is considered negatively dominant if $\Delta^{hor}_{ij}<0$; and if a point (i, j) is vertically dominant, it is herein considered positively dominant if $\Delta^{ver}_{ij}>0$, and is considered negatively dominant if $\Delta^{ver}_{ij}<0$.

(The determinations of positively and negatively dominant points are utilized hereinbelow to substantially eliminate rope-like textures from the ROIs.)

Figure 2E:

After determination of vertically and horizontally dominant points in step 102, the values of these points are transferred to step 104, wherein is made a second more specific determination of text kernels. The determination at step 104 is similar to that described with reference to step 54 of the first processing stage hereinabove, but uses the finer-resolution information provided by step 102. As an example, FIG. 2E is an illustration of text kernel positions found for the image of FIG. 2A, after passage through step 104.

Values of positions of text kernels and of horizontally and vertically dominant points, as well as whether the dominance is positive or negative, are transferred to step 106 (FIG. 6), wherein is made a second evaluation whether a rectangular region of the image comprises text, as defined and described with reference to step 56 of the first processing stage hereinabove. All the text boxes are grouped in ROIs according to the grouping criterion defined with reference to equation (8) hereinabove, and the positions of the boxes are transferred to step 108.

Figure 7A:
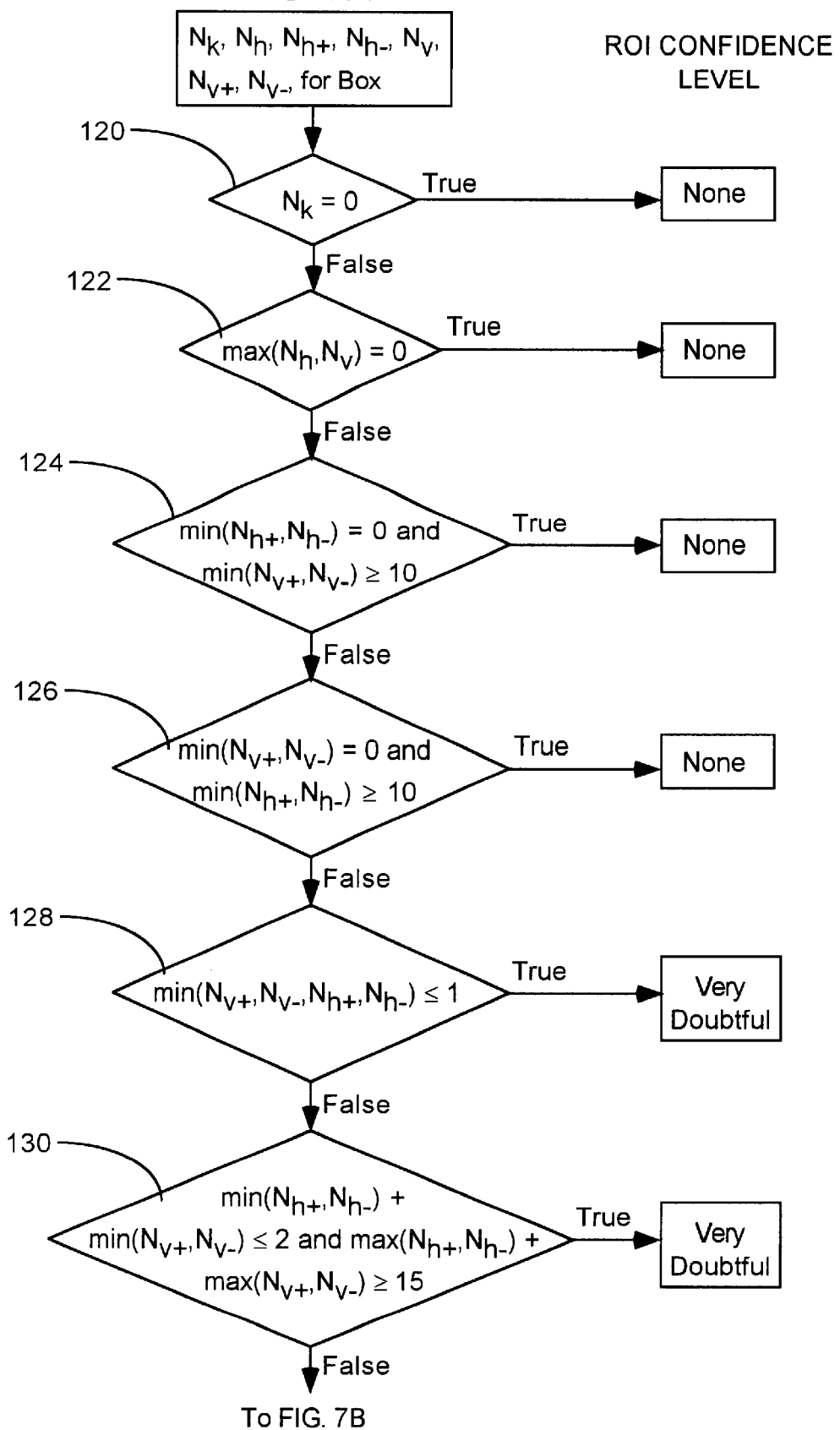

FIG. 7A and FIG. 7B are flowcharts schematically illustrating conditions checked in step 108, in accordance with a preferred embodiment of the present invention. Step 108 further analyzes the ROIs found in step 106 so as to determine whether a box is a text ROI, and to determine one of four confidence level classifications thereof: none, very doubtful, doubtful and sure. The analysis is via a series of decisions dependent on the values of $N_k$, $N_h$, $N_{h+}$, $N_-$, $N_v$, $N_{v+}$, and $N_{v-}$, for the ROI being analyzed, wherein:

$N_k$ is the number of kernels;

$N_h$ is the number of horizontally dominant points;

$N_{h+}$ is the number of horizontal positively dominant points;

$N_{h-}$ is the number of horizontal negatively dominant points;

$N_v$ is the number of vertically dominant points;

$N_{v+}$ is the number of vertical positively dominant points; and $N_{v-}$ is the number of vertical negatively dominant points.

The flowcharts of FIGS. 7A and 7B comprise a series of conditions imposed on the above-listed parameters, according to which each ROI is classified and assigned a confidence level. It will be understood that these specific conditions have been chosen empirically, based on the specific application, operating environment and hardware configuration of system 10 (FIG. 1). In other embodiments of the present invention, the parameters and conditions imposed thereon may be altered to meet different application needs, as will be clear to those skilled in the art.

Beginning with FIG. 7A, a condition 120, $N_k=0$, is true when there are no kernel points in the ROI. A condition 122, $max(N_h, N_v)=0$, is true when there are no dominant points in the ROI. Thus, text is most probably not present when either condition 120 or 122 is true, and the ROI is classified accordingly. A condition 124, $\min(N_{h+}, N_{h-})=0$ and $\min(N_{v+}, N_{v-}) \geq 10$, being true most probably corresponds to a straight horizontal line. A condition 126, $\min(N_{v+}, N_{v-})=0$ and $\min(N_{h+}, N_{h-}) \geq 10$, being true most probably corresponds to a straight vertical line. If any of conditions 120, 122, 124, or 126 is true, the confidence level is assigned a fourth (lowest) classification of "None."

A condition 128, $\min(N_{v+}, N_{v-}, N_{h+}, N_{h-}) \leq 1$, is true when the number of positively or negatively dominant points is very small, whereas we have found that text ROIs most typically have larger numbers of these points. A condition 130, $\min(N_{h+}, N_{h-})+\min(N_{v+}, N_{v-}) \leq 2$ and $\max(N_{h+}, N_{h-})+\max(N_{v+}, N_{v-}) \geq 15$, is true when the points show too much orientation (vertical or horizontal) of image features in the ROI compared to typical, more balanced values we have found for text ROIs. If either condition 128 or condition 130 is true the confidence level is assigned a third classification of "Very-Doubtful."

A condition 132 (FIG. 7B), $\min(N_h, N_v) \leq 2$ and $\max(N_h, N_v) \geq 10$, is true if the points display too much directional orientation in both directions, as measured using absolute criteria. A condition 134, $\min(N_h, N_v) \geq 2$ and $\max(N_h, N_v) \geq 5 \cdot \min(N_h, N_v)$, is true if the points display too much directional orientation in both directions, as measured using relative criteria. A condition 136, $\min(N_{h+}, N_{h-}) \leq 2$ and $\max(N_{h+}, N_{h-}) \geq 10$, is true if the points display too much directional orientation in the horizontal direction, as measured using absolute criteria. A condition 138, $\min(N_{h+}, N_{h-}) \geq 2$ and $\max(N_{h+}, N_{h-}) \geq 5 \cdot \min(N_{h+}, N_{h-})$, is true if the points display too much directional orientation in the horizontal direction, as measured using relative criteria. A condition 140, $\min(N_{v+}, N_{v-}) \leq 2$ and $\max(N_{v+}, N_{v-}) \geq 10$, is true if the points display too much directional orientation in the vertical direction, as measured using absolute criteria. A condition 142, $\min(N_{v+}, N_{v-}) \geq 2$ and $\max(N_{v+}, N_{v-}) \geq 5 \cdot \min(N_{v+}, N_{v-})$, is true if the points display too much directional orientation in the vertical direction, as measured using relative criteria. If any of conditions 132, 134, 136, 138, 140, or 142 is true, the points within the ROI show too much orientation, and the confidence level is assigned a second classification of "Doubtful."

If none of conditions 120, 122, 124, 126, 128, 130, 132, 134, 136, 138, 140, or 142 is true, then the ROI is assigned a first (highest) classification of "Sure."

Step 110 (FIG. 6) receives the positions and confidence levels of text ROIs as determined in step 108, and reclassifies the Doubtful and Very-Doubtful text ROIs into either Sure (contains text) or None (does not contain text). Step 110 is performed in the following sub-steps:

1. A Doubtful ROI having a Sure ROI in its 8-neighborhood, which is a set of boxes defined in equation (9) hereinbelow, is classified as a Sure ROI; otherwise it is classified as a Very-Doubtful ROI.
2. A Very-Doubtful ROI having a Sure ROI in its 8-neighborhood, or which is connected to a Sure ROI by another Very-Doubtful ROI in a horizontal or a vertical direction, is classified as a Sure ROI.
3. All remaining ROIs are classified as None.
4. The reclassification according to steps 1, 2, and 3, is performed according to the grouping criterion described with reference to equation (8) hereinabove, except that text kernel elements must be present in a region between adjacent ROIs.

The 8-neighborhood of a box (i', j') is a set of boxes (i, j) such that $$\max(|i-i'|, |j-j'|)=1 \qquad (9)$$

It has been found that sub-step 4 substantially rejects rope-like textures that may be present in the image, splits well-separated text ROIs, and prevents splitting of correct ROIs.

Figure 8:
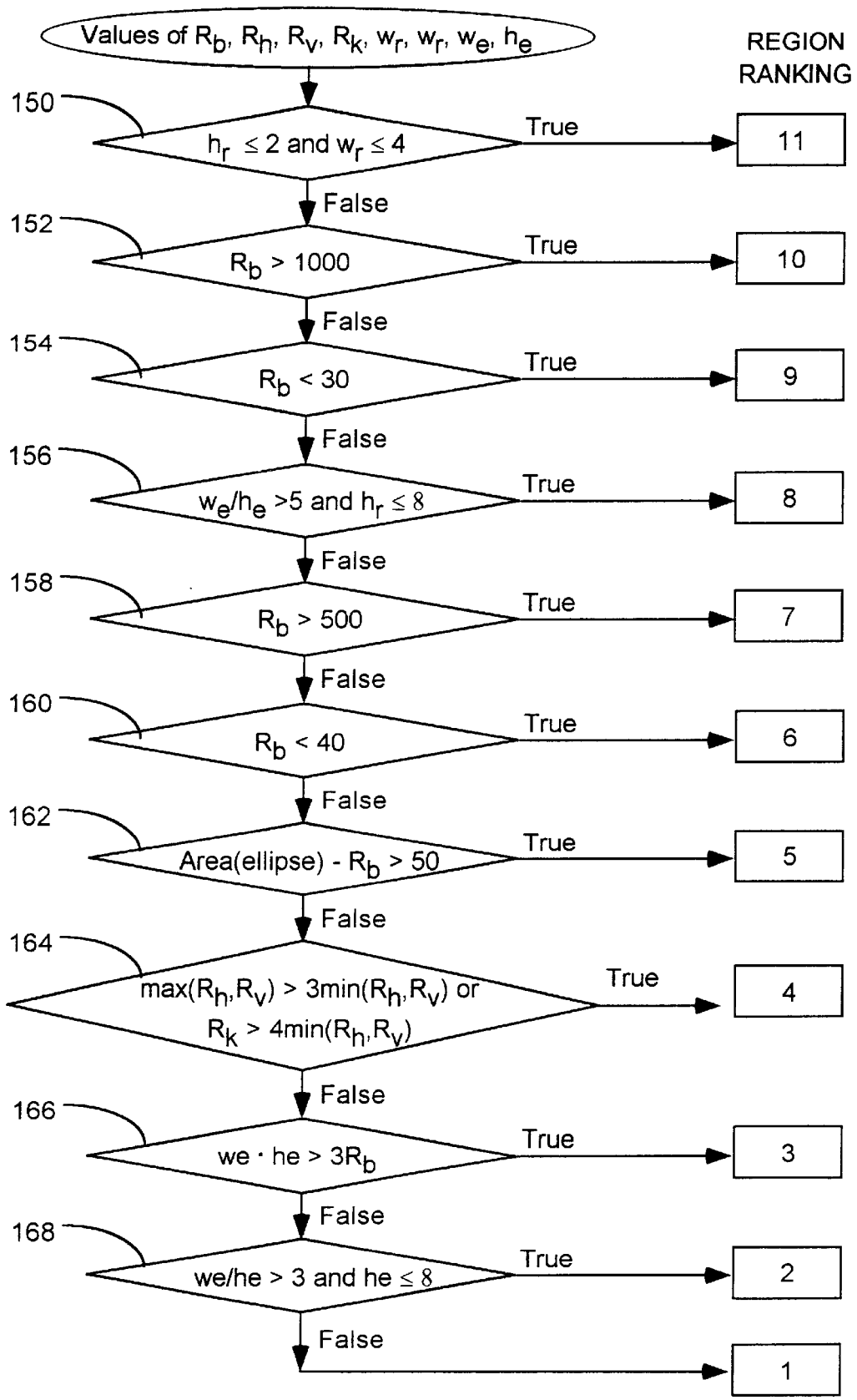
FIG. 8 is a flowchart that schematically illustrates a method of ranking text fields found in a final step of FIG. 6, in accordance with a preferred embodiment of the present invention.

FIG. 8 is a flowchart that schematically illustrates conditions checked in a classification step 112 of the process of FIG. 6, in accordance with a preferred embodiment of the present invention. Step 112 ranks each Sure ROI found in step 110, herein termed an ROI region, in terms of likelihood of containing text. Most preferably, step 112 uses the following measures in order to determine a rank of an ROI region:

1. Number of m×n boxes, herein termed $R_b$, in the ROI region;
2. Number of horizontally dominant points, vertically dominant points, and kernel points, herein termed $R_h$, $R_v$, and $R_k$ respectively, in the ROI region;
3. Width and height, herein termed $w_r$ and $h_r$ respectively, of a smallest rectangle containing the ROI region; and
4. Major and minor axes, herein termed $w_e$ and $h_e$ respectively, of a smallest ellipse containing the ROI region.

The ranking is via a series of conditions, described in detail hereinbelow, dependent on the values of $R_b$, $R_h$, $R_v$, $R_k$, $w_r$, $h_r$, $w_e$, and $h_e$. As noted hereinabove, the particular parameters and conditions may be altered responsive, to system configuration and application requirements. The conditions are checked sequentially.

If a condition 150 wherein $h_r \leq 2$ and $w_r \leq 4$ is true, the region is assumed to be too small to be a text label, and is given a lowest rank of 11. If a condition 152 wherein $R_b > 1000$ is true, the region is assumed to be too large, and is given a rank 10. If a condition 154 wherein $R_b < 30$ is true, the region is assumed to be too small, and is given a rank 9. If a condition 156 wherein $w_e/h_e > 5$ and $h_r \leq 8$ is true, the region is assumed to be too oriented, and is given a rank 8. If a condition 158 wherein $R_b > 500$ is true, the region is assumed to be too large and is given a rank 7. If a condition 160 wherein $R_b < 40$ is true, the region is assumed too small and is given a rank 6. If a condition 162 wherein area (ellipse)$-R_b > 50$ is true, the region is assumed to be insufficiently filled and is given a rank 5. If a condition 164 wherein $\max(R_h, R_v) > 3 \min(R_h, R_v)$ or $R_k > 4 \min(R_h, R_v)$ is true, the region is considered to be too oriented and is given a rank 5. If a condition 166 wherein $w_e h_e > 3 R_b$ is true, the region is considered to be insufficiently filled and is given a rank 4. If a condition 168 wherein $w_e/h_e > 3$ and $h_e \leq 8$ is true, the region is considered to be oriented and is given a rank 2. If none of conditions 150, 152, 154, 156, 158, 160, 162, 164, 166, or 168 is true, the region is given the highest rank of 1.

Figure 2F:
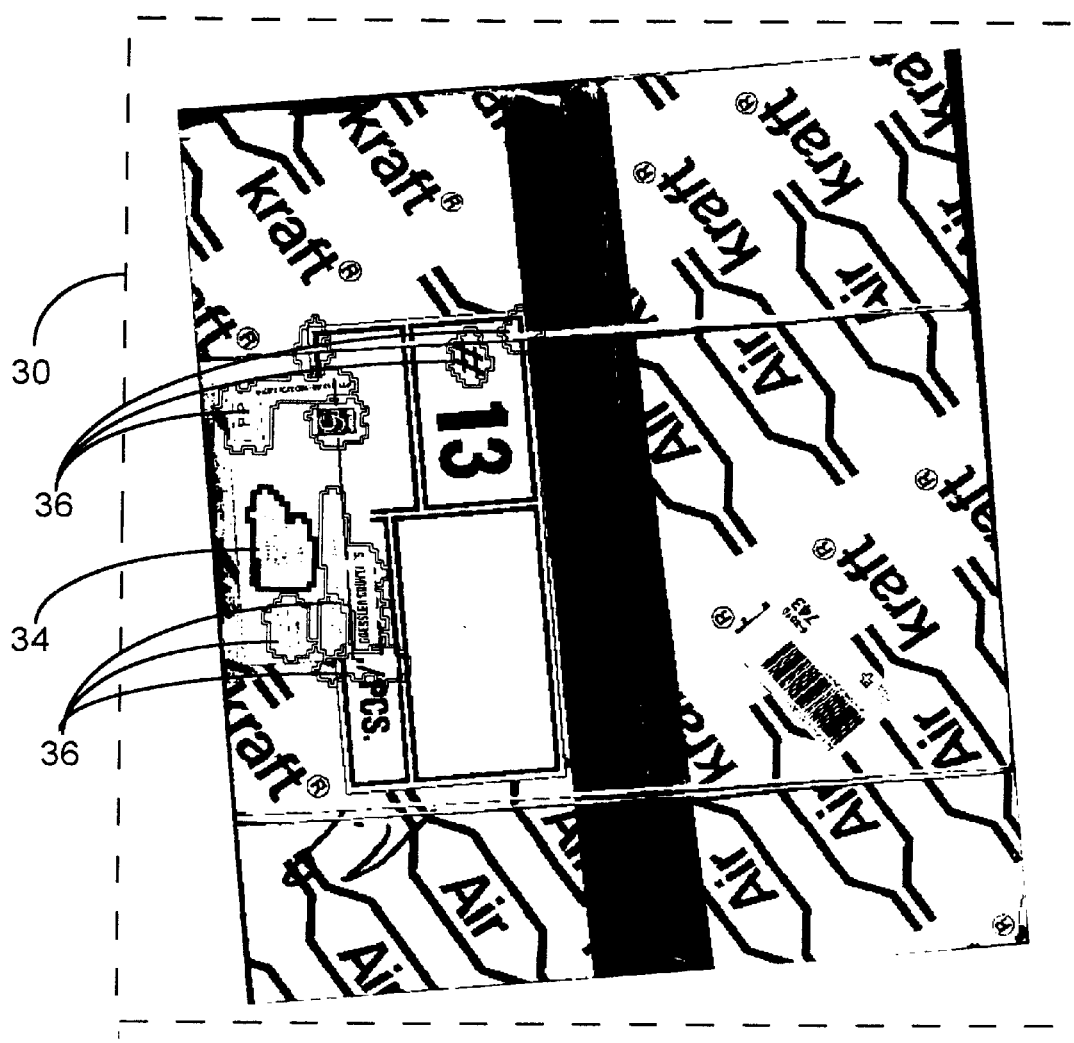

After classification as described hereinabove, second stage processor 15 (FIG. 1) outputs a final set of positions and dimensions of text ROIs and a final associated rank for each text ROI. As an example, FIG. 2F is an illustration of text ROI positions 36, outlined by double lines, found for the image of FIG. 2A, after passage through second stage processor 15. A highest ranked text ROI 34 is outlined in a thicker line. Most preferably, the output is further processed by a text processor 17 or transferred to one or more additional processing units wherein text within the text ROIs as found by step 112 is analyzed or decoded, using any suitable techniques known in the art, such as optical character recognition (OCR). Alternatively or additionally, the output of step 112 is applied inter alia to conveyer belt 20 in order to correctly route parcel 11.

The principles of the present invention thus enable imaging systems to detect text ROIs with higher efficiency and reduced false negative results, compared to detecting systems at present known in the art. Although the preferred embodiment described herein makes reference to system 10 for sorting parcels, it will be understood that the principles of the present invention may similarly be used in other text-identification applications.

While the preferred embodiment as described hereinabove uses a first and a second processing stage operating with dominant points and text kernels to locate text ROIs, it will be appreciated that one or more further stages operating with dominant points and/or text kernels may additionally be applied to gray-scale images to locate text ROIs. All such stages, and their use in locating text ROIs, are considered to be within the scope of the present invention. Furthermore, the specific image parameters defined in the context of the preferred embodiment described hereinabove and the decision conditions and classifications applied to these parameters are cited by way of example. Those skilled in the art will be capable of adapting the parameters, conditions and classifications to the needs of other applications to which the present invention is applicable.

It will be further understood that other stages operating with dominant points as described hereinabove may be constructed to locate other kinds of structured field within an image, for example, locating a set of diagonal lines. All such stages, and their use in locating a specific structured field, are considered to be within the scope of the present invention. It will thus be appreciated that the preferred embodiments described above are cited by way of example, and the full scope of the invention is limited only by the claims.

What is claimed is:

1. A method for locating a structured field in a gray-scale image of an object, comprising:

choosing a plurality of anchor points in the image, each anchor point having a gray-scale value associated therewith;

determining for each anchor point a horizontal variation dependent on a difference between the gray-scale value of the anchor point and the gray-scale value of a horizontally neighboring anchor point and a vertical variation dependent on a difference between the gray-scale value of the anchor point and the gray-scale value of a vertically neighboring anchor point;

defining as vertically or horizontally dominant respectively those anchor points whose vertical and horizontal variations obey a first or a second predefined condition;

identifying one or more kernels in the image, each such kernel comprising a group of anchor points in predetermined mutual proximity and satisfying a third predefined condition relating the number of vertically-dominant and horizontally-dominant anchor points in the group; and locating the structured field in the image using the one or more kernels.

2. A method according to claim 1, wherein the structured field comprises an alphanumeric text field.

3. A method according to claim 2, wherein the text field comprises an address field in a mailed object.

4. A method according to claim 1, and comprising sorting the object responsive to the structured field that is located.

5. A method according to claim 1, wherein choosing the plurality of anchor points comprises choosing the anchor points to be at the vertices of congruent contiguous rectangles.

6. A method according to claim 1, wherein locating the structured field comprises dividing the image into a plurality of regions and finding one or more of the regions which have large numbers of kernels therein relative to others of the regions.

7. A method according to claim 6, wherein finding the one or more of the regions comprises assigning a ranking level to each of the regions indicative of a likelihood that the region has a desired characteristic.

8. A method according to claim 7, wherein assigning the ranking level comprises evaluating kernels in peripheral regions adjacent to the one or more regions.

9. A method according to claim 7, wherein assigning the ranking level comprises assigning a ranking responsive to respective numbers of vertically dominant points and horizontally dominant points in the one or more regions.

10. A method according to claim 6, wherein locating the structured field comprises using an iterative location method, comprising choosing additional anchor points in the one or more regions and repeating with respect to the additional anchor points the steps of determining the horizontal and vertical variations, defining the vertically- and horizontally-dominant points and identifying the one or more kernels.

11. A method according to claim 10, wherein choosing the additional anchor points comprises choosing anchor points mutually more closely spaced than the anchor points outside the one or more regions.

12. A method according to claim 1, wherein the first predefined condition comprises that the vertical variation be above a predetermined threshold and exceed the horizontal variation by a predetermined factor.

13. A method according to claim 1, wherein the second predefined condition comprises that the horizontal variation be above a predetermined threshold and exceed the vertical variation by a predetermined factor.

14. A method according to claim 1, wherein the third predefined condition comprises that there be at least one vertically dominant point and at least one horizontally dominant point within the group.

15. A method for locating a structured field in a gray-scale image of an object, comprising:

choosing a plurality of anchor points in the image, each anchor point having a gray-scale value associated therewith;

determining for each anchor point, a horizontal variation dependent on a difference between the gray-scale value of the anchor point and the gray-scale value of a horizontally neighboring anchor point and a vertical variation dependent on a difference between the gray-scale value of the anchor point and the gray-scale value of a vertically neighboring anchor point;

defining as vertically-dominant those anchor points whose vertical variations exceed their horizontal variations by a predefined factor, and as horizontally-dominant those anchor points whose horizontal variations exceed their vertical variations by a predefined factor; and locating the structured field in the image responsive to the locations of at least some of the vertically-dominant and horizontally-dominant anchor points.

16. A method according to claim 15, wherein locating the structured field comprises locating a text field.

17. A method according to claim 15, wherein locating the structured field comprises finding a region of the image including a mixture of horizontally- and vertically-dominant anchor points.

18. A method for sorting an object marked with information in a structured field thereon, comprising:
- capturing a gray-scale image of the object;
- choosing a plurality of anchor points in the image, each anchor point having a gray-scale value associated therewith;
- determining for each anchor point, a horizontal variation dependent on a difference between the gray-scale value of the anchor point and the gray-scale value of a horizontally neighboring anchor point and a vertical variation dependent on a difference between the gray-scale value of the anchor point and the gray-scale value of a vertically neighboring anchor point;
- defining as vertically or horizontally dominant those anchor points whose vertical and horizontal variations respectively obey a first or a second predefined condition;
- identifying one or more kernels in the image, each such kernel comprising a group of anchor points in predetermined mutual proximity and satisfying a third predefined condition relating the number of vertically-dominant and horizontally-dominant anchor points in the group;
- locating the structured field using the one or more kernels;
- deciphering information contained in the structured field; and
- routing the object responsive to the deciphered information.

19. Apparatus for locating a structured field in a gray-scale image of an object, comprising:
- an image capture device which forms the gray-scale image of the object; and
- an image processing unit which:
  - chooses a plurality of anchor points in the image;
  - associates with each anchor point a gray-scale value;
  - determines for each anchor point a horizontal variation dependent on a difference between the gray-scale value of the anchor point and the gray-scale value of a horizontally neighboring anchor point and a vertical variation dependent on a difference between the gray-scale value of the anchor point and the gray-scale value of a vertically neighboring anchor point;
  - defines as vertically or horizontally dominant respectively those anchor points whose vertical and horizontal variations obey a first or a second predefined condition;
  - identifies one or more kernels in the image, each such kernel comprising a group of anchor points in predetermined mutual proximity and satisfying a third predefined condition relating the number of vertically-dominant and horizontally-dominant anchor points in the group; and
  - locates the structured field in the image using the one or more kernels.

20. Apparatus according to claim 19, wherein the structured field comprises an alphanumeric text field.

21. Apparatus according to claim 20 wherein the text field comprises an address field in a mailed object.

22. Apparatus according to claim 19, and comprising an object sorter which sorts the object responsive to the structured field that is located.

23. Apparatus for locating a structured field in a gray-scale image of an object, comprising:
- an image capture device which forms the gray-scale image of the object; and
- an image processing unit which:
  - chooses a plurality of anchor points in the image;
  - associates with each anchor point a gray-scale value;
  - determines for each anchor point, a horizontal variation dependent on a difference between the gray-scale value of the anchor point and the gray-scale value of a horizontally neighboring anchor point and a vertical variation dependent on a difference between the gray-scale value of the anchor point and the gray-scale value of a vertically neighboring anchor point;
  - defines as vertically-dominant those anchor points whose vertical variations exceed their horizontal variations by a predefined factor, and as horizontally-dominant those anchor points whose horizontal variations exceed their vertical variations by a predefined factor; and
  - locates the structured field in the image responsive to the locations of at least some of the vertically-dominant and horizontally-dominant anchor points.

24. Apparatus for sorting an object marked with information in a structured field thereon, comprising:
- an image capture device which forms the gray-scale image of the object;
- an image processing unit which:
  - chooses a plurality of anchor points in the image;
  - associates with each anchor point a gray-scale value;
  - determines for each anchor point, a horizontal variation dependent on a difference between the gray-scale value of the anchor point and the gray-scale value of a horizontally neighboring anchor point and a vertical variation dependent on a difference between the gray-scale value of the anchor point and the gray-scale value of a vertically neighboring anchor point;
  - defines as vertically or horizontally dominant those anchor points whose vertical and horizontal variations respectively obey a first or a second predefined condition;
  - identifies one or more kernels in the image, each such kernel comprising a group of anchor points in predetermined mutual proximity and satisfying a third predefined condition relating the number of vertically-dominant and horizontally-dominant anchor points in the group;
  - locates the structured field using the one or more kernels;
  - deciphers information contained in the structured field; and
- an object router which routs the object responsive to the deciphered information.

* * * * *